Patented Nov. 25, 1941

2,263,887

UNITED STATES PATENT OFFICE 2,263,887

PROCESS AND CATALYST FOR POLYMERIZING FATTY OILS

Fremont P. Parkin, Minneapolis, Minn., assignor to Minnesota Linseed Oil Paint Company, Minneapolis, Minn., a corporation of Minnesota No Drawing. Application May 1, 1941, Serial No. 391,437

9 Claims. (Cl. 260—407)

This invention relates to catalytic processes for heat polymerizing fatty oils and to catalysts useful in such heat polymerizing or "oil bodying" processes.

In the production of varnishes, enamels, most paints and various oil modified resins, various fatty oils are compounded with natural or artificial resinous materials and pigments and fillers, if desired, together with the other ingredients.

The fatty oils used are initially of low viscosity, but either prior to or in the process of making the varnish, enamel or paint, the fatty oil is subjected to treatment for increasing its viscosity, in some instances, to the extent of forming gelled masses. In the trade, such processes are known as "bodying" and an oil so processed is known as a bodied oil.

While heating is a primary factor in the polymerization or "bodying" of fatty oils, and has long been used, mere heating is subject to disadvantages, in that (1) a lengthy heating period is required to achieve requisite viscosity, and (2) during heating darkening of color frequently occurs.

According to the present invention, heat polymerization or "bodying" of fatty oils (or the varnish, enamel, paint or resin compositions in which fatty oils are a constituent) may be accomplished with good results and in a shortened period by the use of aryl or alkyl disulphides in catalytic amounts.

It is accordingly objects of the invention to provide improved catalytic processes and catalysts for heat "bodying" or polymerizing fatty oils, and to provide the fatty oil mixtures containing such polymerization catalysts.

Other and further objects of the invention are those inherent in the processes herein illustrated, described and claimed.

In carrying out the invention, there is incorporated into the oil a small amount of aryl or alkyl disulphide either as a component part of the oil sold in commerce or prior to or during the heat bodying process.

Diaryl or dialkyl disulphides are preferred for use in the present invention. As examples of the diaryl disulphides, there may be mentioned diphenyl disulphide, dibenzyl disulphide or dicresyl disulphide wherein the aryl neuclii may be either substituted or unsubstituted.

As examples of the dialkyl disulphides, there may be mentioned diethyl disulphide, dimethyl disulphide or diisoamyl disulphide.

The selection of the particular disulphide used, depends upon the conditions under which it is introduced into the fatty oil, the extent and conditions under which the oil is handled and stored prior to the bodying treatment, the type of bodying treatment and apparatus used therefor, and the extent to which darkening of color affects the usability of the resultant product.

Where the fatty oil is to be sold in commerce, the paint and varnish trade (and hence must undergo shipment under occasionally very cold conditions), it is desirable to select as the aryl or alkyl disulphide, one that remains soluble under the conditions encountered in storage or shipment, and as the oil may be used for light colored varnishes, paints or enamels, it is preferred to select one having little tendency to darken the color of the resultant bodied oil or finishing composition.

Where the heat bodying is done in an enclosed pressure vessel, the volatility of the selected disulphide has little importance since it is, under such conditions, maintained in the reaction mixture even though the temperatures of the heat bodying treatment i. e. 500–600° F. exceed the boiling point of the disulphide. However, where the bodying is carried out in an open vessel, or in one operated at atmospheric pressures, it is preferable to utilize a higher boiling-point disulphide.

For convenience, it is desirable to select a disulphide which is soluble in the fatty oil at room temperatures or at temperatures not greatly exceeding 200–250° F., except where the disulphide is not added until the heat bodying operation is begun in which case the higher temperatures therein encountered assist in dissolving the disulphide catalyst addition.

The selected diaryl or dialkyl disulphide is preferably used in an amount ranging from .05% to .5% by weight although some variation above and below these limits may be used. For most fatty oils, the desired decrease in time of bodying may be obtained with catalysts used in amounts ranging from .2% to .3% based upon the weight of the oil.

The invention is illustrated in the following example which, however, is not to be understood as a limitation upon the invention:

To 1000 parts by weight of alkali refined linseed oil, is added 2 parts by weight (i. e. 0.2%) of diphenyl disulphide. The diphenyl disulphide readily dissolves in the oil at from 150°–200° F., and remains dissolved in the oil when subsequently cooled or chilled. The oil remains unchanged in color after the diphenyl disulphide is dissolved therein.

The effect upon the rate of polymerization is illustrated by the following data from parallel test runs under identical conditions. The "control" was ordinary alkali refined linseed oil, the product under consideration being such oil having 0.2% by weight diphenyl disulphide catalyst added thereto. Each was heated as in usual commercial bodying processes, until the temperature increased to approximately 590° F., and that temperature was then maintained for a number of hours. Viscosity determinations were made at intervals, using as a standard of comparison, a standard bubble viscosimeter calibrated in "poises."

| Poises | Commercial alkali re-refined linseed oil control | Commercial alkali re-refined linseed oil with 2% diphenyl disulphides |
| --- | --- | --- |
| 12 | After 3 hours heating | After 1½ hours heating. |
| 36 | After 4 hours heating | After 2 hours heating. |
| 70 | After 5 hours heating | After 2½ hours heating. |
| 150 | After 5¾ hours heating | After 3 hours heating. |

The control sample darkened very slightly during bodying (as is normal for such commercial grade alkali refined linseed oil). The 0.2% diphenyl disulphide sample was not perceptibly darkened during bodying.

The rate of "bodying" or heat polymerization in the example given was practically twice as fast when using 0.2% diphenyl disulphide catalyst as when using no catalyst.

The diaryl or dialkyl disulphide polymerization catalysts may be used in various fatty oils of the drying and semi-drying types whether in their natural state or processed oils. Thus, the catalysts may be used in linseed, soya bean, Perilla, sunflower, rape or the like fatty oils.

Various modifications and changes may be made in the materials, compositions and modes of procedure herein described without departing from the spirit of the invention, some of the features of which are defined in the appended claims, as follows:

I claim as my invention:

1. The process for heat bodying fatty oils of the drying and semi-drying types comprising using as a catalyst a disulphide selected from the class consisting of diaryl disulphides and dialkyl disulphides, said disulphide catalyst being used in sufficient proportion to have a substantial catalytic effect upon the bodying of the oil during heating.

2. The process for heat bodying fatty oils of the drying and semi-drying types comprising using as a catalyst a disulphide selected from the class consisting of diaryl disulphides and dialkyl disulphides, said catalyst being used in an amount ranging from .05% to about 0.5% of the disulphide catalyst, based upon the weight of the fatty oil, being used.

3. An oil of the class of drying and semi-drying oils adapted to be bodied by heat and containing as bodying catalyst approximately .05% to 0.5% of a disulphide selected from the class consisting of diaryl disulphides and dialkyl disulphides, said catalyst being used in sufficient proportion to have a substantial catalytic effect upon the bodying of the oil during heating.

4. The process for heat bodying fatty oils of the drying and semi-drying types comprising using as a catalyst diphenyl disulphide, said catalyst being used in a sufficient proportion to have a substantial catalytic effect upon the bodying of the oil during heating.

5. The process for heat bodying fatty oils of the drying and semi-drying types comprising using as a catalyst diphenyl disulphide, said catalyst being used in an amount ranging from .05% to 0.5% of the weight of the fatty oil so as to have a substantial catalytic effect upon the bodying of the oil during heating.

6. An oil of the class of drying and semi-drying oils adapted to be bodied by heat and containing as bodying catalyst approximately .05% to 0.5% of diphenyl disulphide, said catalyst being used in sufficient proportion to have a substantial catalytic effect upon the bodying of the oil during heating.

7. In a fatty oil adapted to be bodied by heat, a catalyst comprising a disulphide selected from the class consisting of diaryl disulphides and dialkyl disulphides, said catalyst being present in sufficient proportion to have a substantial catalytic effect upon the bodying of the oil during heating.

8. The process of heat bodying fatty oils of the drying and semi-drying types comprising using as a catalyst a dibenzyl disulphide, said catalyst being used in a sufficient proportion to have a substantial catalytic effect upon the bodying of the oil during heating.

9. An oil of the class of drying and semi-drying oils adapted to be bodied by heat and containing as bodying catalyst approximately .05% to 0.5% of a dibenzyl disulphide, said catalyst being used in sufficient proportion to have a substantial catalytic effect upon the bodying of the oil during heating.

FREMONT P. PARKIN.